United States Patent
Wilson-Jones et al.

(10) Patent No.: US 12,384,453 B2
(45) Date of Patent: Aug. 12, 2025

(54) DUAL MOTOR DRIVE ASSEMBLY

(71) Applicant: ZF Automotive UK Limited, Solihull (GB)

(72) Inventors: Russell Wilson-Jones, Stratford upon Avon (GB); Mark Anthony Wilkes, Birmingham (GB); Aleksejs Semjonovs, Snohomish, WA (US)

(73) Assignee: ZF Automotive UK Limited, Solihull (GB)

( * ) Notice: Subject to any disclaimer, the term of this patent is extended or adjusted under 35 U.S.C. 154(b) by 0 days.

(21) Appl. No.: 18/363,185

(22) Filed: Aug. 1, 2023

(65) Prior Publication Data

US 2024/0051603 A1 Feb. 15, 2024

(30) Foreign Application Priority Data

Aug. 9, 2022 (GB) .................................. 2211648

(51) Int. Cl.
*B62D 5/00* (2006.01)
*B62D 6/00* (2006.01)

(52) U.S. Cl.
CPC .............. *B62D 6/008* (2013.01); *B62D 5/006* (2013.01)

(58) Field of Classification Search
CPC ......... B62D 6/008; B62D 5/006; B62D 5/005
See application file for complete search history.

(56) References Cited

U.S. PATENT DOCUMENTS

| | | | |
|---|---|---|---|
| 2021/0107557 A1* | 4/2021 | Wilkes | B62D 5/006 |
| 2021/0107560 A1* | 4/2021 | Wilson-Jones | B62D 5/006 |
| 2023/0227097 A1* | 7/2023 | Ojima | B62D 5/0484 |
| | | | 701/43 |

FOREIGN PATENT DOCUMENTS

| | | | | |
|---|---|---|---|---|
| GB | 2583342 A | * 10/2020 | | B62D 1/20 |
| JP | 2016107764 A | 6/2016 | | |
| JP | 2016215864 A | 12/2016 | | |

* cited by examiner

*Primary Examiner* — Jacob M Amick
(74) *Attorney, Agent, or Firm* — Kristin L. Murphy

(57) ABSTRACT

A dual motor drive assembly comprising a housing, a shaft rotatably mounted with respect to the housing, a first gear connected to and configured to rotate with the shaft, first and second motors, each having an output driving a respective output gear, the output gears being engaged with the first gear, an allocation arrangement for allocating torque demands to each of the first and second motors, a target friction detection arrangement for determining a target friction, a calculation arrangement for calculating a mechanical friction, wherein the target friction and mechanical friction are compared, and wherein the mechanical friction is modified to meet the target friction by varying the difference between the two motor torque demands when the two motor torques are in opposing directions.

20 Claims, 11 Drawing Sheets

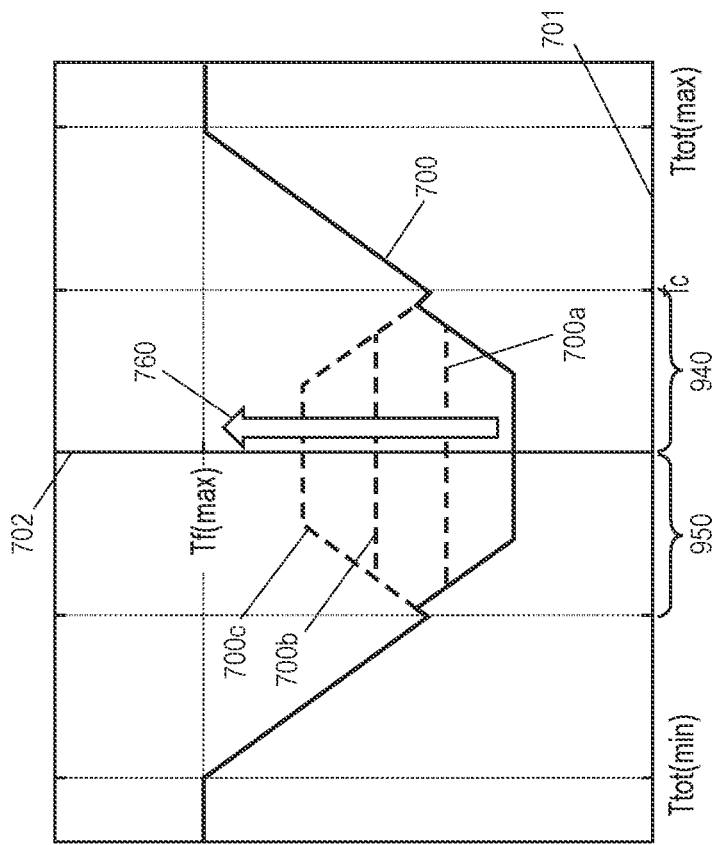
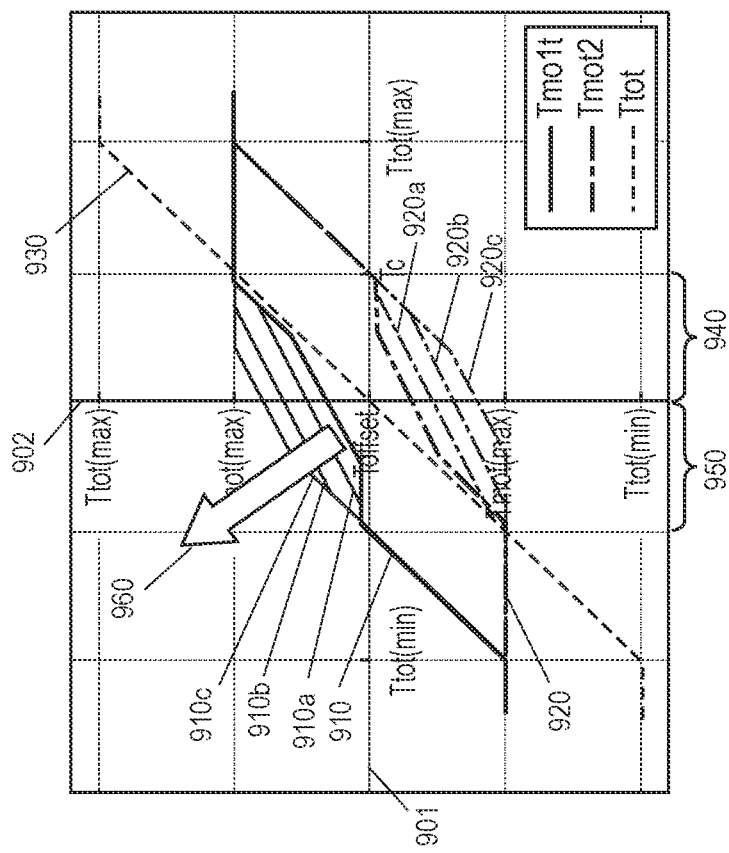
FIG. 7A
FIG. 7B

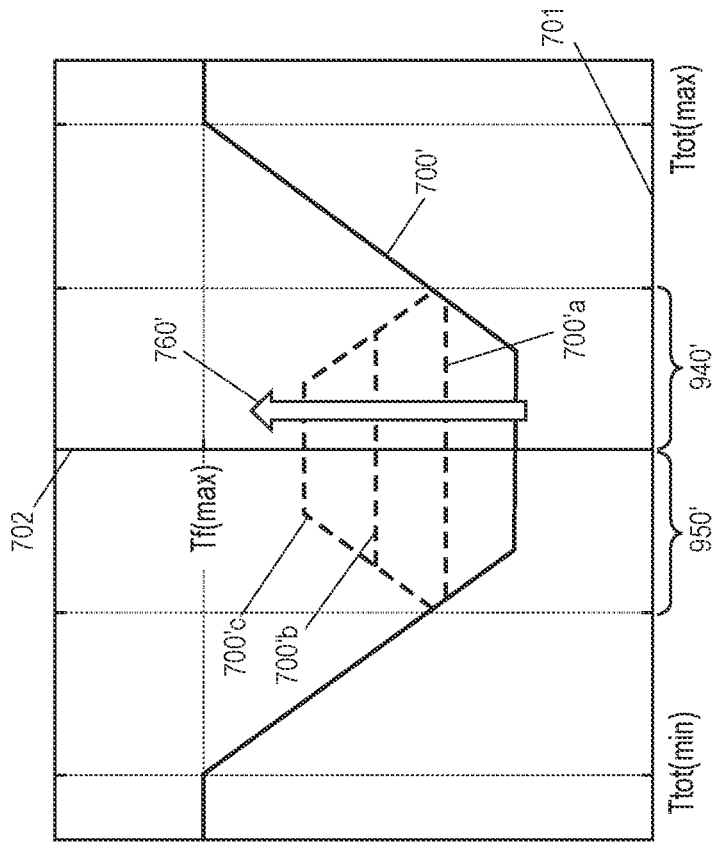
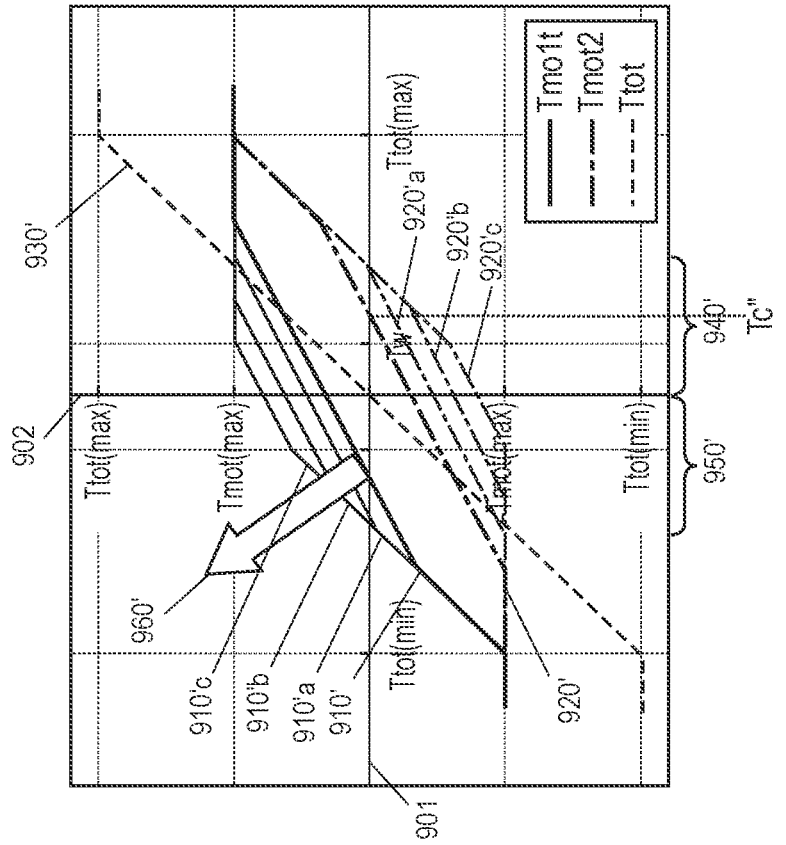
FIG. 8A
FIG. 8B

DUAL MOTOR DRIVE ASSEMBLY

CROSS-REFERENCE TO RELATED APPLICATION

This application claims priority to GB Priority Application No. 2211648.7, filed Aug. 9, 2022, the disclosure of which is incorporated herein by reference in its entirety.

TECHNICAL FIELD

This disclosure relates to a dual motor drive assembly, for example, but not exclusively, suitable for use in a handwheel actuator (HWA) assembly of a vehicle.

BACKGROUND

Electric motors are widely used and are increasingly common in automotive applications. For example, it is known to provide an electrically power assisted steering system in which an electric motor apparatus applies an assistance torque to a part of a steering system to make it easier for the driver to turn the wheels of the vehicle. The magnitude of the assistance torque is determined according to a control algorithm which receives as an input one or more parameters such as the torque applied to the steering column by the driver turning the wheel, the vehicle speed and so on.

Another example of use of electric motors in automotive applications in in steer-by-wire systems. During normal use, these systems have no direct mechanical link from the hand wheel that the driver moves and the steered wheels with movement of the hand wheel by the driver being detected by a sensor and the motor being driven in response to the output of the sensor to generate a force that steers the road wheels. These systems rely on sensors to relay user input data at a steering wheel to control units which integrate user input data with other information such as vehicle speed and yaw rate, to deliver control signals to a primary motor that physically actuates a steering rack of the vehicle. The control units also act to filter out unwanted feedback from the front wheels and provide a response signal to a secondary electric motor coupled to the steering wheel. The secondary motor provides the driver with the appropriate resistance and feedback in response to specific user inputs at the steering wheel to mimic the feel of a conventional steering system.

In a steer-by-wire system, a malfunction or failure of a portion of the assembly may impair the ability to steer the vehicle. As a result, it is desirable to provide the assembly with structure for providing at least a temporary fail-safe operation. US 2006/0042858 A1 discloses steering apparatus including a steering assembly that includes a handwheel actuator. The handwheel actuator includes a steering column for supporting a steering wheel, a gear mechanism and two motors, each for providing a torque to the steering column.

GB 2579374 A discloses a steering column assembly for use with a steer-by-wire hand wheel actuator. This assembly utilises a similar dual motor drive system that comprises first and second motors, each having an output driving a respective output gear. Each output gear drives a first gear which is connected to and configured to rotate a shaft of the steering wheel to provide a sensation of road feel to the driver. The dual motor drive system is used to reduce gear rattle by driving both motors at the same time to apply opposing torques to the steering column. Having two motors also provides for some redundancy in the system.

In typical electric power steering (EPS) systems, the mechanical friction is often greater than desired and there may be friction compensation control strategies that are designed to cancel out some of the friction torque. However, it is usually desirable to have some friction in the handwheel to give a good driver feel. The HWA can be designed to have a low level of mechanical friction, especially at low output torque levels and in some circumstances additional friction needs to be provided or simulated to give a good steering feel.

The steering control system that determines the required HWA feedback torque may include a target friction component. This friction component can be implemented by a combination of actual mechanical friction and a synthetic friction. Mechanical friction be defined as friction that is generated by sliding action within the HWA. This can be modulated by varying the force applied to the sliding surfaces. "Synthetic friction" may be used to describe friction effects that are generated by varying the net torque output the HWA. This can include both friction simulation, or generation, (that increases the perceived friction level) and friction compensation (that reduces the perceived friction level). As such, synthetic friction may be used to describe a net torque opposing the turning of the handwheel.

If the mechanical friction is greater than required, then synthetic friction may be induced to cancel (or compensate) some of the mechanical friction. If the mechanical friction is less than required, then the synthetic friction should simulate extra friction to augment the mechanical friction to achieve the desired steering feel.

Friction is a nonlinear effect, and it can be difficult to introduce synthetic friction to simulation or compensate mechanical friction, particularly at low velocity. For a steering system it is particularly difficult to introduce synthetic friction in and around the "on-centre" region when the feedback force is relatively low, and the angular velocity of the steering wheel may also be low.

Mechanical friction within an HWA assembly is dominated by load-dependent component that increases as the torque transmitted by the electric motor assembly increases. This means that the mechanical friction at low feedback torque is less than required.

It would be beneficial to increase this low-load friction to improve the steering feel. It is also beneficial to increase this friction in a controlled manner to allow the steering feel to be varied according to the driver's preference or the current operating condition.

SUMMARY

The present disclosure seeks to ameliorate the problems associated with conventional motor assemblies.

In accordance with a first aspect of the present disclosure, a dual motor drive assembly comprises:
  a housing;
  a shaft rotatably mounted with respect to the housing;
  a first gear connected to and configured to rotate with the shaft;
  first and second motors, each having an output driving a respective output gear, the output gears being engaged with the first gear;
  a control circuit for allocating independent torque demands to each of the first and second motors to cause a net torque to be applied to the shaft, the torques applied by the two motors being in opposition at low outputs;

an allocation arrangement for allocating torque demands to each of the first and second motors;

a target friction determination arrangement for determining a target friction;

a calculation arrangement for calculating a mechanical friction;

wherein the target friction and mechanical friction are compared, and wherein the mechanical friction is modified to meet the target friction by varying the difference between the two motor torque demands when the two motor torques are in opposing directions.

A net torque may be defined as an instantaneous sum of the two motor torque demands. When the two motor torques are in opposing directions, the torque demand of the motors may be adjusted such that the torque demand of each motor is increased or decreased by an equal and opposite magnitude. In this way, the mechanical friction may be modified to meet the target friction by varying the difference between the two motor torque demands while maintaining a constant net torque value. As such, for each net torque value where two motor torques are in opposing directions, the mechanical friction may be modified to meet the target friction.

The calculation arrangement for calculating a mechanical friction may use any one or more of: the allocated torque demands to each of the first and second motors; the motor current demands of the first and second motors. The calculation arrangement may be described as a calculation arrangement for calculating a magnitude of mechanical friction acting on the shaft of an HWA assembly.

The target friction may comprise a mechanical friction component and a synthetic friction component. Synthetic friction may be described as the net torque applied to the worm wheel gear in a direction opposing the turning of the shaft by a driver of the vehicle.

At higher steering torques, the synthetic component can be more easily modified to meet the target friction, but not at lower steering torques. Therefore, the exemplary arrangements of the disclosure may advantageously provide an assembly capable of meeting a target friction at lower total steering torques by modifying the mechanical torque, i.e. modifying the mechanical torque when the two motor torques are in opposing directions.

If the mechanical friction is greater than the target friction, then the synthetic friction is adjusted to oppose at least a portion of the mechanical friction such that a total friction is reduced. If the mechanical friction is less than the target friction, then the synthetic friction is adjusted such that the total friction is increased. This is particularly useful at higher net torque values when the motor torques are acting in the same direction on the steering column shaft.

The dual motor drive assembly may form part of a handwheel actuator assembly for a vehicle, where the shaft includes a fixing part whereby it can be fixed to a steering wheel or yoke.

In one exemplary arrangement, the first gear comprises a worm wheel gear and each of the output gears comprises a worm screw.

The rotational axes of the two worm screws may be substantially parallel or they may be inclined with respect to each other. The rotational axes of the two worm screws may extend perpendicularly to the rotational axis of the first gear.

This arrangement may advantageously reduce the overall size of the assembly, which facilitates fitting it within a relatively limited volume within the vehicle.

The motors may be located within the housing.

The motors may be substantially identical apart from their orientation. The output gears may also be substantially identical so that the torque multiplication from the motors to the shaft are the same.

The torque demand to the controller is separated into a torque feedback part and a friction part.

A synthetic torque demand is calculated and subtracted from the torque feedback part to give a modified torque demand.

The modified torque demand and friction part are used to calculate the two motor torque demands according to an allocation scheme, such as shown in the Figures. The allocation calculation limits the friction demand according to the limits of the selected allocation scheme.

The two motor torque demands are converted to motor current demands and passed to the motor controllers.

The motor torque demands are used to calculate the achieved mechanical friction magnitude.

The difference between the mechanical friction magnitude and friction part of the total torque demand is used to calculate the demanded synthetic friction. If there is insufficient mechanical friction, then the synthetic friction is simulated to increase the total perceived friction. If the mechanical friction is too high, then the synthetic friction is used to compensate for the excess mechanical friction.

A method to calculate the synthetic friction is to multiply the synthetic friction demand by the sign of the measured angular velocity.

According to a second aspect of the disclosure, a method of modifying the mechanical friction in a dual motor drive assembly, the dual motor drive assembly comprises:

a housing; a shaft rotatably mounted with respect to the housing; a first gear connected to and configured to rotate with the shaft; first and second motors, each having an output driving a respective output gear, the output gears being engaged with the first gear; and wherein the method comprises the steps:

allocating torque demands to each of the first and second motors;

determining a target friction;

calculating a mechanical friction;

comparing the target friction and mechanical friction; and when the two motor torques are in opposing directions, modifying the mechanical friction to meet the target friction by varying the difference between the two motor torque demands.

Allocating torque demands to each of the first and second motors may include: separating a total torque demand to the controller into a torque feedback part and a friction part;

calculating a synthetic friction demand and subtracting this from the torque feedback part to give a modified torque demand; and calculating a motor torque demand for each of a first and second motor using the modified torque demand and the friction part, according to an allocation scheme.

The method may further include:

converting the motor torque demand for the first motor to a first motor current demand and passing the first motor current demand to a first motor controller; and converting the motor torque demand for the second motor to a second motor current demand and passing the second motor current demand to a second motor controller.

The method may include calculating the mechanical friction, including measuring a difference between the mechanical friction magnitude and the friction part and calculating the demanded synthetic friction using the difference.

BRIEF DESCRIPTION OF DRAWINGS

By way of example only, a specific exemplary arrangement of the present disclosure incorporated into a handwheel actuator assembly for a vehicle will now be described with reference to the accompanying drawings, in which:

FIG. 7A shows a relationship between the total feedback torque demanded and the feedback torque applied by the two motors in the dual motor drive assembly according to a first aspect of the disclosure;

FIG. 7B shows the resultant relationship between the net torque applied in FIG. 7A and a mechanical friction torque generated by an interaction of sliding surfaces in an HWA assembly;

FIG. 8A shows a relationship between the total feedback torque demanded and the feedback torque applied for a dual motor drive assembly according to a first aspect of the disclosure;

FIG. 8B shows the resultant relationship between the net torque applied in FIG. 8A and a mechanical friction torque generated by an interaction of sliding surfaces in an HWA assembly;

DETAILED DESCRIPTION

Figure 1:
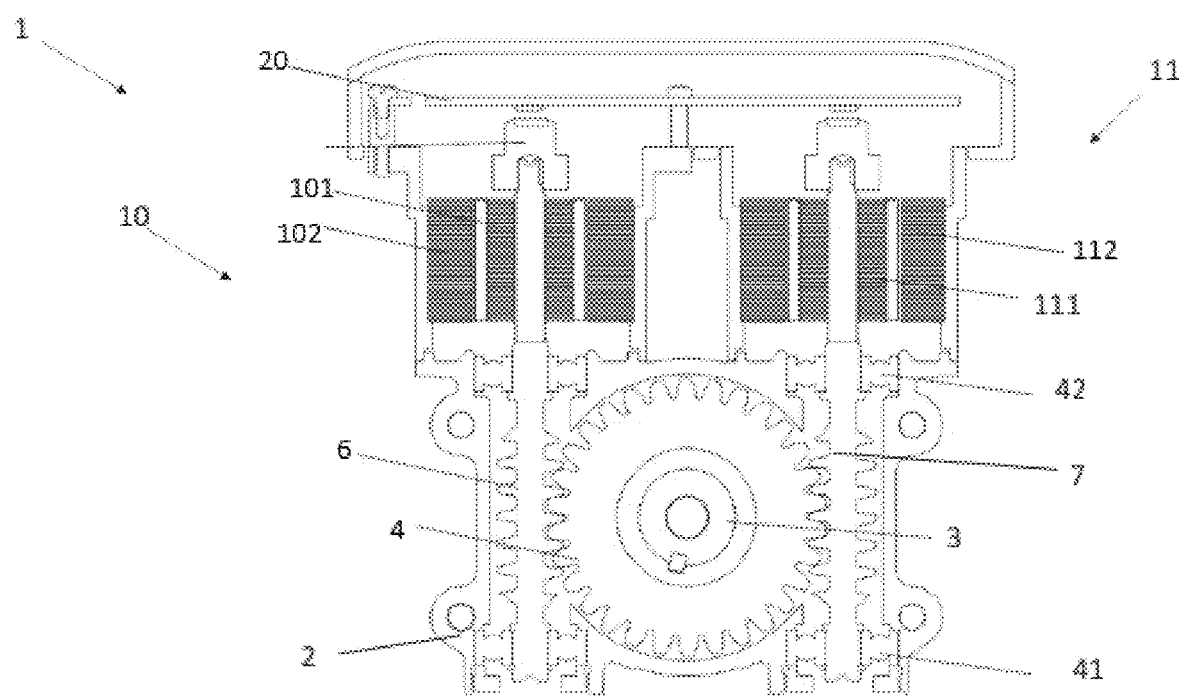
FIG. 1 shows an exemplary arrangement of a dual motor drive assembly according to a first aspect of the disclosure.

FIG. 1 shows a dual motor drive assembly, suitable for use in a handwheel actuator (HWA) assembly of a vehicle, according to a first aspect of the disclosure. The drive assembly 1 includes a first motor 10 and a second motor 11, the first motor 10 being connected to a first worm gear 6 and the second motor 11 being connected to a second worm gear 7. Each worm gear 6, 7 comprises a threaded shaft arranged to engage with a gear wheel 4 connected to a steering column shaft such that torque may be transferred from the worm gears 6, 7 to the gear wheel 4 connected to the steering column shaft. The gear wheel 4 is operatively connected to a driver's steering wheel (not shown) via the steering column shaft. In this example, each of the two motors 10, 11 are brushless permanent magnet type motors and each comprise a rotor 101, 111 and a stator 102, 112 having many windings surrounding regularly circumferentially spaced teeth. The arrangement of the two motors 10, 11, the shaft 3, the worm gears 6, 7 and the wheel gear 4 together form a dual motor electrical assembly.

Each of the two motors 10, 11 are controlled by an electronic control unit (ECU) 20. The ECU 20 controls the level of current applied to the windings and hence the level of torque that is produced by each motor 10, 11.

In this example, the two motors 10, 11 are of a similar design and produce a similar level of maximum torque. However, it is within the scope of this disclosure to have an asymmetric design in which one motor 10, 11 produces a higher level of torque than the other 10, 11.

One of the functions of a handwheel actuator (HWA) assembly is to provide a feedback force to the driver to give an appropriate steering feel. This may be achieved by controlling the torque of the motors 10, 11 in accordance with signals from the handwheel actuator (such as column angle) and from other systems in the vehicle (such as vehicle speed, rack angle, lateral acceleration and yaw rate).

The use of two motors 10, 11 is beneficial in eliminating rattle. If a single electric motor were instead used in a torque feedback unit, the motor may be held in locked contact with the gearing by a spring. However, in certain driving conditions the action of a spring is not sufficiently firm, which allows the gears to "rattle" during sinusoidal motions or sharp position changes of the steering column.

Use of two motors 10, 11 which can be actively controlled (as in the present embodiment) ameliorates the problems associated with use of a single motor. In this arrangement, both motors 10, 11 are controlled by the ECU 20 to provide torque feedback to the steering column and to ensure that the worm shafts 6, 7 of both motors 10, 11 are continuously in contact with the gear wheel 4, in order to minimise rattle. The use of two motors 10, 11 in this way also allows active management of the friction and thereby the feedback force to the driver.

As shown in FIG. 1, the motors 10, 11 are received in and secured to a transversely extending two-part extension of a housing 2. The worm shaft 6, 7 of each motor is supported relative to the housing by two sets of bearings. A first set of bearings 41 supports a first end of each worm shaft 6, 7 distal their respective motor 10, 11 while a second set of bearings 42 supports a second end of each worm shaft 6, 7 proximal their respective motor 10, 11.

Figure 2:
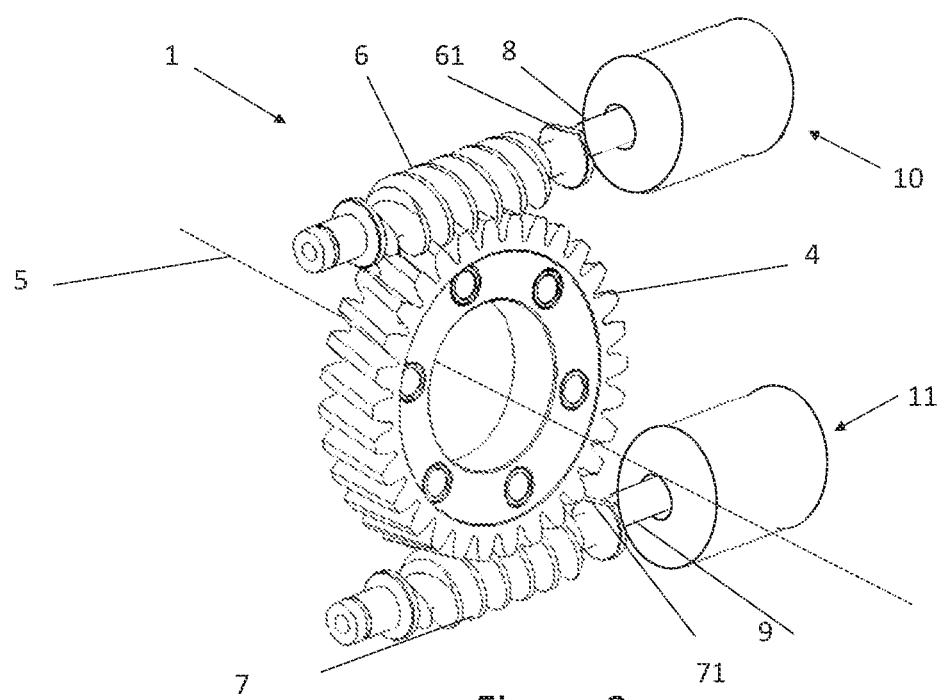
FIG. 2 shows a part of the dual motor drive apparatus of FIG. 1 with the gearbox housing removed to better show the gears and the motor connection to the gears.

As best seen in FIG. 2, a gear wheel 4 is secured to the end of the shaft 3 and rotates with the shaft 3. The shaft is not shown in FIG. 2 but the axis of rotation of the shaft is marked using a dashed line 5, extending perpendicularly through the gear wheel 4. The periphery of the gear wheel 4 is formed as a worm gear which meshes with each of two identical worm screws 6, 7 located on opposite sides of the longitudinal axis 5 of the shaft 3. Each worm screw 6, 7 is connected to the output shaft 8, 9 of a respective electric motor 10, 11. Each worm screw 6, 7 is provided with a respective indicator 61, 71 providing an alignment arrangement to mechanically align each rotor with the worm screw teeth during assembly. In this example, the indicators 61, 71 are flattened sections of joining faces of each of the worm screws 6, 7.

Figure 4:
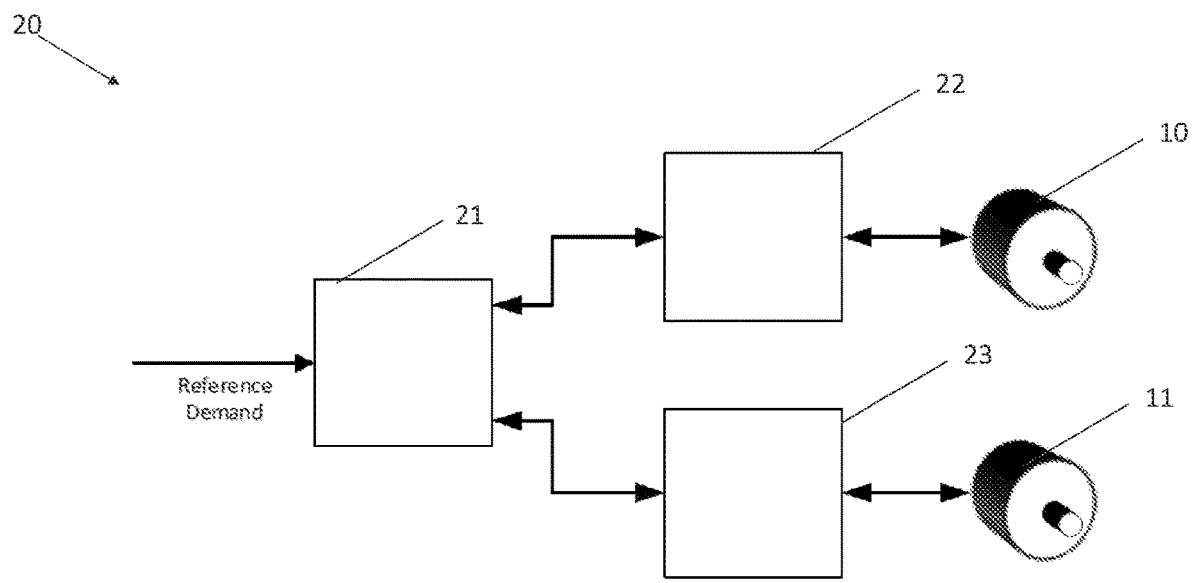
FIG. 4 shows a general arrangement of an electronic control unit which controls the two motors of a dual motor drive assembly according to a first aspect of the disclosure.

The axes of the output shafts 8, 9 of the two motors 10, 11 are arranged perpendicularly to the rotational axis of the shaft 3 and, as best seen in FIGS. 2 and 4, the axes of the two motors may also be inclined with respect to each other, to reduce the overall size of the assembly.

The motors 10, 11 are controlled by the electronic control unit (ECU) 2 such that at low levels of input torque applied to the shaft 3 by the steering wheel, the motors 10, 11 act in opposite directions on the gear wheel 4 to eliminate backlash. At higher levels of input torque applied to the shaft 3 by the steering wheel, the motors 10, 11 act in the same direction on the gear wheel 4 to assist in rotation of the shaft 3. Here, a motor 10, 11 acting in 'a direction' is used indicate the direction of torque applied by a motor 10, 11 to the gear wheel 4.

The use of two separate motors 10, 11 which can be controlled in a first operational mode to apply torque in opposite directions to the gear wheel 4 eliminates the need to control backlash with precision components. In addition, the use of two separate motors 10, 11 which can be controlled in a second operational mode to apply torque in the same direction to the gear wheel 4 allows the motors 10, 11 and gear components 4, 6, 7 to be specified at half the rating of the required total system torque, thereby reducing the size and cost of the drive assembly 1.

In the exemplary arrangement shown in FIGS. 1 and 2, the worm shafts 6, 7 engage diametrically opposed portions of a gear wheel 4. The threads of the worm shafts 6, 7 each have the same sense, i.e., they are both left-handed screw threads. The motors 10, 11 are configured such that they lie on the same side of the gear wheel 4 (both motors 10, 11 lie on one side of a virtual plane perpendicular to axes of the worm shafts 6, 7 and passing through the center point of the gear wheel 4). Considering as an example the perspective shown in FIG. 2, driving both motors 10, 11 clockwise would apply torque in opposite directions to the gear wheel 4, with motor 10 applying a clockwise torque to gear wheel 4 and motor 11 applying an opposing anti-clockwise torque to gear wheel 4.

Figure 3:
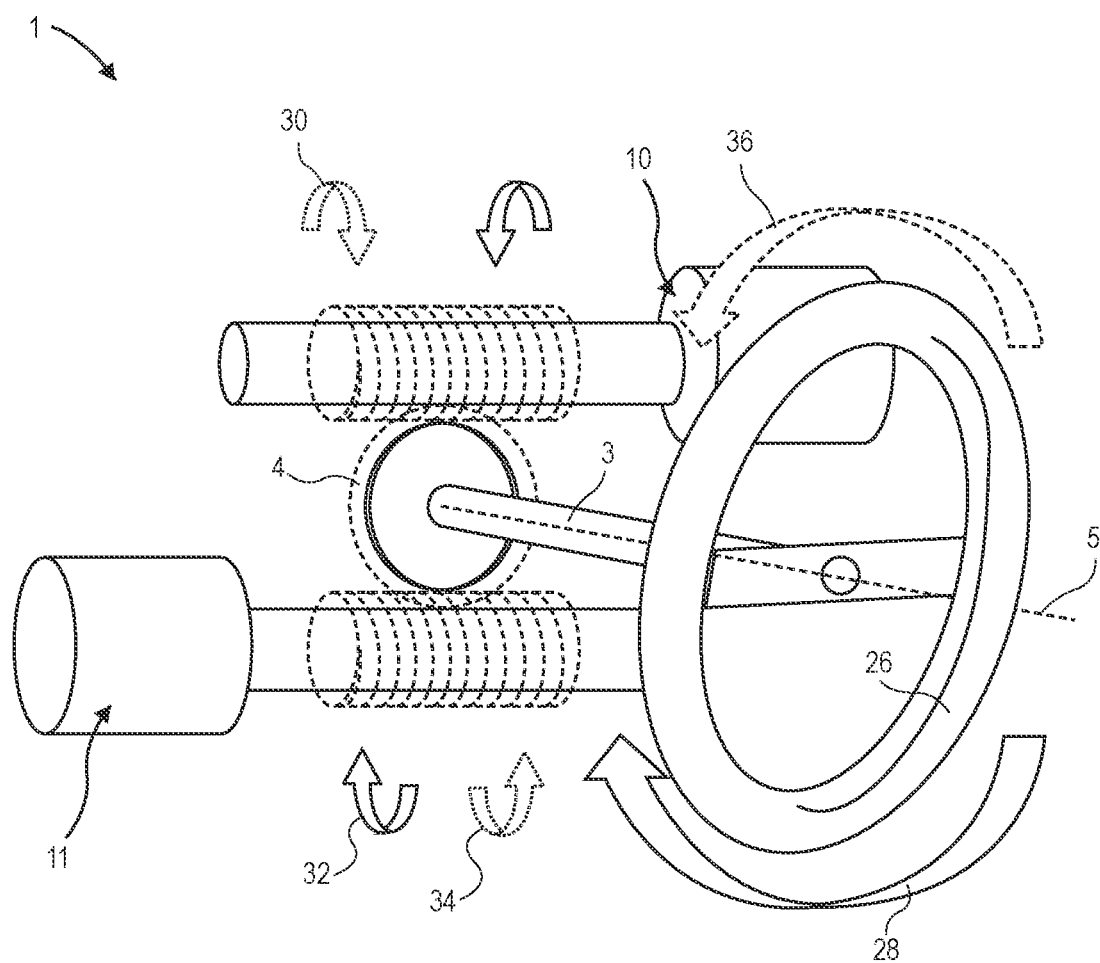
FIG. 3 shows another exemplary arrangement of a dual motor drive assembly according to a first aspect of the disclosure.

FIG. 3 shows another exemplary arrangement of a dual motor drive assembly, substantially similar to the arrangement shown in FIGS. 1 and 2 but with different motor positioning.

FIG. 3 shows another exemplary arrangement of a dual motor drive assembly 1 according to the first aspect of the disclosure. This exemplary arrangement is substantially similar to the arrangement shown in FIGS. 1 and 2 with the only difference being the positioning of the motors 10, 11. Components and functional units which in terms of function and/or construction are equivalent or identical to those of the preceding arrangement are provided with the same reference signs and are not separately described. The explanations pertaining to FIG. 1 and FIG. 2 therefore apply in analogous manner to FIG. 3 with the exception of the positioning of the two motors 10, 11.

In FIG. 3 the worm shafts 6, 7 engage diametrically opposed portions of a gear wheel 4 and threads of the worm shafts 6, 7 each have the same sense, i.e., they are both right-handed screw threads. The motors 10, 11 are configured such that they lie on opposing sides of the gear wheel 4 (motor 10 lies on one side of a virtual plane perpendicular to axes of the worm shafts 6, 7 and passing through the center point of the gear wheel 4 while motor 11 lies on the other side of this virtual plane).

Application of torque by a driver in a clockwise direction indicated by solid arrow 28 results in rotation of the steering wheel 26 and the steering column 24 about the dashed line 5. This rotation is detected by a rotation sensor (not shown). The first motor 10 is then controlled by the ECU 20 to apply torque in the opposite direction as indicated by dashed arrow 30. In a first operational mode, the second motor 11 is actuated by the ECU 20 to apply an offset torque 32 in the opposite direction to the torque 30 of the first motor 10 to reduce gear rattling. Alternately, in a second operational mode, the second motor 11 is actuated by the ECU 20 to apply a torque 34 in the same direction to the torque 30 of the first motor 10 to increase the feedback torque to the steering column 24. Whether the drive assembly 1 is operated in the first operational mode or in the second operational mode depends on the circumstances, as will be explained below.

The net result of the torques 30, 32, 34 applied by the first and second motors 10, 11 results in an application of a feedback torque to the steering column 24 and steering wheel 26 in the opposite direction to that applied to the steering wheel by the driver, as indicated by a dashed arrow 36, to provide a sensation of road feel to the driver. In this way, the "rattle" produced between the worm shafts 6, 7 and the gear wheel 4 can be eliminated or significantly reduced.

FIG. 4 reveals part of an HWA assembly 80 showing a general arrangement of an electronic control unit (ECU) 20 which controls each of the two motors 10, 11. The ECU 20 includes a hand wheel actuator (HWA) control system 21 as well as a first and second motor controller 22, 23 which control the first and second motors 10, 11 respectively. A reference demand signal is input to the HWA control system 21 which allocates torque demands to each of the first and second motors 10, 11. These motor torque demands are converted to motor current demands and transmitted to the first and second motor controllers 22, 23. Each motor 10, 11 provides operating feedback to their respective motor controller 22, 23. The HWA control system 21 is configured to calculate the magnitude of mechanical friction using the motor torque demands.

Figure 5:
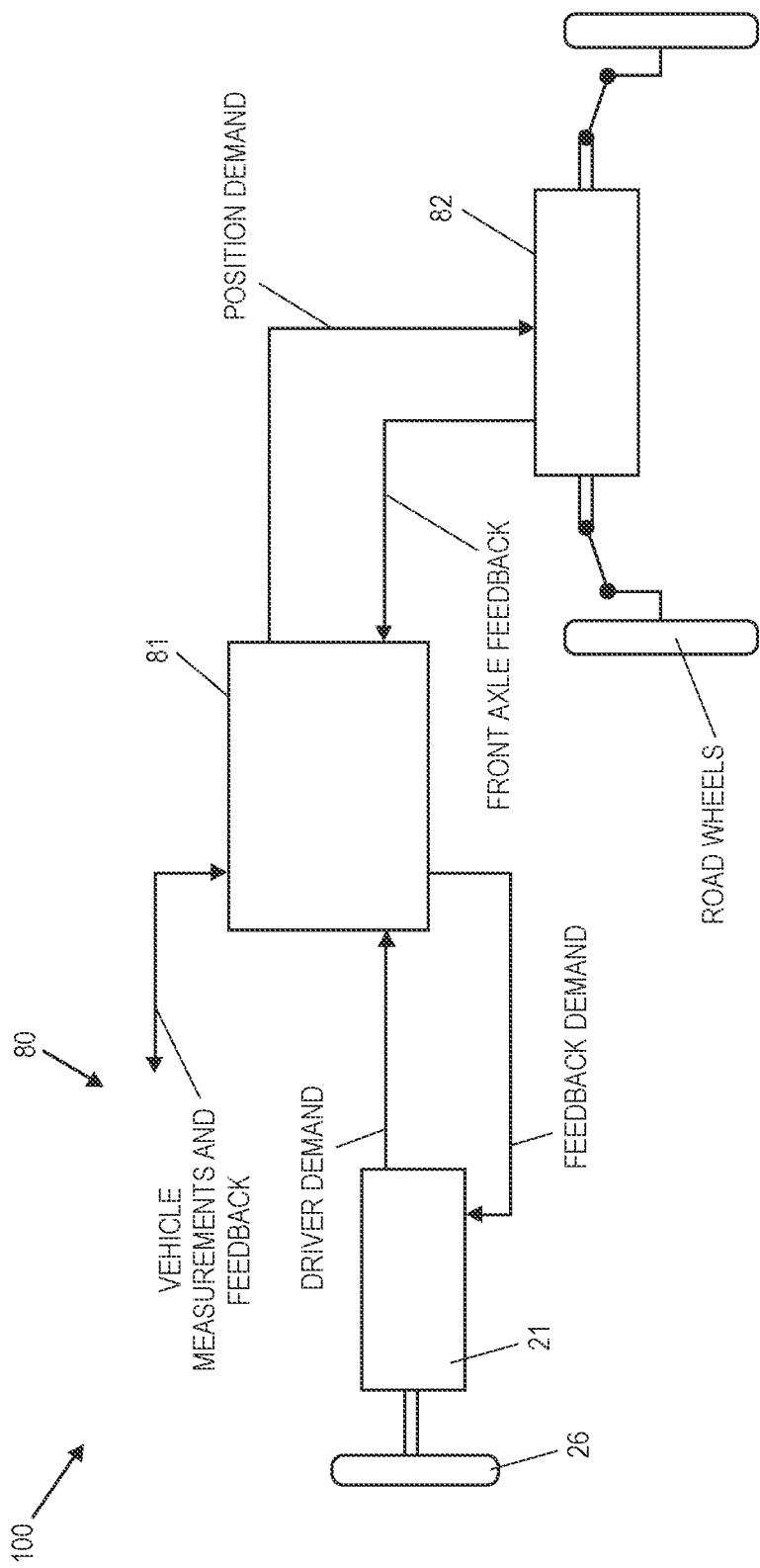
FIG. 5 shows a layout of a Steer-by-Wire system including a dual motor drive assembly according to a first aspect of the disclosure.

FIG. 5 shows an overall layout of a Steer-by-Wire system 100 for a vehicle including handwheel actuator (HWA) assembly 80 using a dual motor drive assembly 1 according to a first aspect of the disclosure. The HWA assembly 80 supports the driver's steering wheel 26 and measures the driver demand which is usually the steering angle. A steering controller 81 converts the driver demand into a position demand that is sent to a front axle actuator (FAA) 82. The FAA 82 controls the steering angle of the roadwheels to achieve the position demand. The FAA 82 can feedback operating states and measurements to the steering controller 81.

The steering controller 81 combines the FAA 82 feedback with other information measured in the vehicle, such as lateral acceleration, to determine a target feedback torque that should be sensed by a driver of the vehicle. This feedback demand is then sent to the HWA control system 21 and is provided by controlling the first and second motors 10, 11 with the first and second motor controllers 22, 23 respectively.

FIG. 5 shows the steering controller 81 as physically separate to both the HWA controller 21 and the FAA 82. Alternately, different architectures, where one or more of these components are physically interconnected, may be used within the scope of this disclosure. For example, the functions of the steering controller 81 may be physically implemented in the HWA controller 21, the FAA 82, or another control unit in the vehicle, or some combination of all 3. Alternatively, control functions ascribed to the HWA controller 21 and FAA 82 may be partially or totally implemented in the steering controller 81.

Figures 6A, 6B:
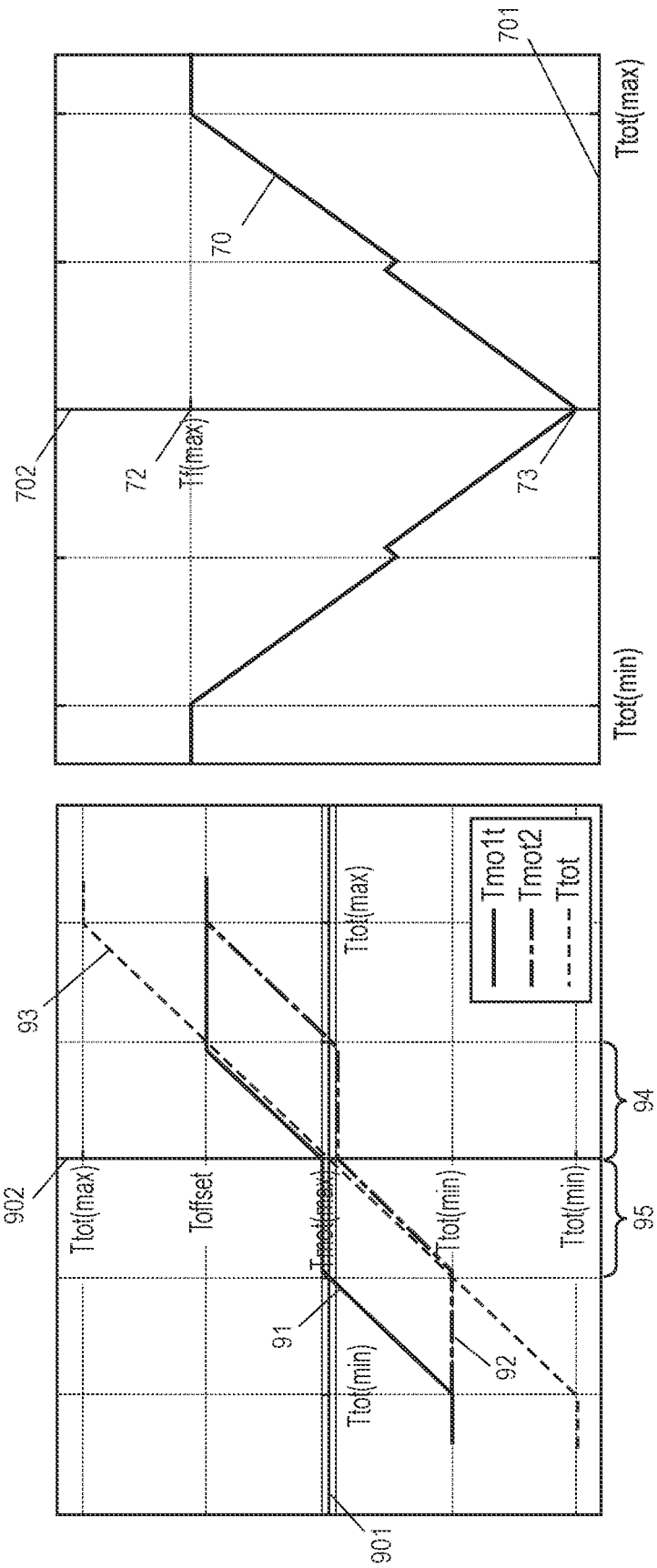
FIG. 6A shows the relationship between the feedback torque demanded and the feedback torque applied for a conventional dual motor drive assembly.
FIG. 6B shows the resultant relationship between the net torque applied in FIG. 6A and a mechanical friction torque generated by an interaction of sliding surfaces in an HWA assembly.

The relationship between the feedback torque demanded (x-axis) 901 and the feedback torque applied (y-axis) 902 for a conventional dual motor drive assembly is shown in FIG. 6A.

Solid line 91 represents the torque applied by the first motor 10 while dashed line 92 represents the torque applied by the second motor 11. The net torque applied by the two motors is represented by dashed line 93. In a first torque range 94 where torque is positive, the first motor 10 applies a torque shown by solid line 91 to provide feedback to the steering column 24 and steering wheel 26, while the second motor 11 applies a smaller magnitude torque known as an "offset torque" in the opposite direction to provide an "active" lock to eliminate or reduce transmission rattle. The roles of the motors change depending in which direction the driver is steering. In a second torque range 95 where the torque is negative, the second motor 11 applies a feedback torque 92 to the steering column 24 and the first motor 10 applies a smaller magnitude "offset" torque 91 in the opposite direction.

The resultant relationship between the net torque applied by the two motors 10, 11 (x-axis 701) and mechanical friction torque generated by the interaction of sliding surfaces in an HWA assembly 80 (y-axis 702), such as quasi-static Coulomb friction, is shown in FIG. 6B by solid line 70.

A typical dual motor drive assembly may be designed to have low levels of mechanical friction at small magnitude net loads and hence a very low level of mechanical friction is present at small magnitude net torques as shown by minimum 73 in FIG. 6B. However, it is often desirable to have a greater degree of friction than this, to oppose motion of the steering wheel 26, to give a good driver feel.

The present disclosure relates to providing a dual motor drive assembly with an additional synthetic friction which combines with the mechanical friction to simulate a good steering feel even at low net torques. This may be achieved by varying the allocation of two motor torque demands in a way that still allows the level of mechanical friction to be dynamically controlled. It may also be beneficial to increase this friction in a controlled manner to allow the steering feel to be varied according to the driver's preference or the current operating condition.

The term 'Mechanical friction' is used here to represent friction that is generated by sliding of components within the dual motor drive assembly 1. This can be modulated by varying the force applied to the sliding surfaces. The term 'Synthetic friction' refers to friction effects that are generated by varying the net torque output the HWA. This can include both friction generation (that increases the perceived friction level) and friction compensation (that reduces the perceived friction level).

The steering control system, such as the steering controller 81, that determines the required HWA feedback torque will include a target friction component. This target friction component can be implemented by a combination of mechanical friction and synthetic friction. For example, if the mechanical friction is greater than required, then the synthetic friction may act to oppose some of the mechanical friction. Alternately, if the mechanical friction is less than required, then the synthetic friction may generate additional friction to augment the mechanical friction to achieve the desired steering feel. An exemplar method for calculating two motor torques can for a given column torque demand and friction torque demand is described below.

Using convention whereby the torque applied by the first motor 10 ($T_{mot1}$) is greater than the torque applied by the second motor 11 ($T_{mot2}$), i.e., $T_{mot1}>=T_{mot2}$, the torque that is applied to the steering column 24 is:

$$T_{col}=N_{gb}T_{mot1}+N_{gb}T_{mot2}\pm N_{gb}T_{loss1}\pm N_{gb}T_{loss2}$$

Where
$T_{col}$=total steering column torque
$N_{gb}$=gearbox ratio
$T_{mot1}$=first motor applied shaft torque
$T_{mot2}$=second motor applied shaft torque
$T_{loss1}$=torque losses associated with first motor 10
$T_{loss2}$=torque losses associated with second motor 11
$T_{loss1}$ and $T_{loss2}$ act in a direction to oppose the motion of the steering column 24.

The torque losses ($T_{loss1}$ and $T_{loss2}$) are dominated by electromagnetic losses in each of the two motors 10, 11 and Coulomb friction in the dual motor drive assembly 1. Together these have a constant torque component and a load-dependent component, i.e.

$$T_{loss1}=\mu|T_{mot1}|+T_{c1}$$

where $|T_{mot1}|$ is the magnitude of the motor torque $T_{c1}$ is the constant component. The load-dependent loss is determined by a factor μ that depends on the design and materials employed in the dual motor drive assembly 1. μ may vary with temperature.

When the dual motor drive assembly 1 is designed to have a low constant friction component, the friction is predominantly load-dependent, i.e. the friction increases as the motor torque increases. This may be shown by:

$$T_{fr}=N_{gb}\mu(|T_{mot1}|+|T_{mot2}|)$$

where $T_{fr}$ is the friction at the gearbox output.

A maximum friction at a particular operating state may be generated by driving the two motors 10, 11 in opposite directions. This maximum friction depends on the amount of torque that is applied to the column:

$$T_{fr(max)}=T_{col(max)}-|T_{col(dem)}|$$

where $T_{fr(max)}$=the maximum friction, $T_{col(max)}$ is the maximum total steering column torque and $T_{col(dem)}$ is the dynamically-varying demanded total steering column torque output.

A minimum possible friction at a particular operating state may be generated by driving the two motors 10, 11 such that there is no offset between them. In this example, the minimum friction may be represented by:

$$T_{fr(min)}=\mu|T_{col(dem)}|$$

1where $T_{fr(min)}$=the minimum friction.

The two motor torques may be calculated to provide a given column torque demand and a given friction torque demand. One suitable calculation is:

For $T_{fr(min)} \leq T_{fr(dem)} \leq T_{fr(max)}$ $$T_{mot1}=(1/N_{gb})(T_{col(dem)}+T_{fr(dem)})/2 \quad \text{(Equation 1)}$$

$$T_{mot2}=(1/N_{gb})(T_{col(dem)}-T_{fr(dem)})/2 \quad \text{(Equation 2)}$$

where $T_{fr(dem)}$ is the demanded friction torque.

This friction control may be applied over the part of the operating range where:

$$|T_{col(dem)}| \leq T_{col(max)}-T_{fr(dem)} \quad \text{(Equation 3)}$$

Outside of this range, other criteria may be applied to allocate the torques to the two motors.

As such, the steering column friction may be varied whilst retaining the offset needed to compensate for backlash between the worm shafts 6, 7 and the gear wheel 4.

This is shown in FIGS. 7A to 9B which disclose example ways in which torque may be allocated to the two motors 10, 11 to control the level of mechanical friction while maintaining a backlash-compensating offset.

FIGS. 7A and 7B show a family of profiles with a modified baseline allocation scheme to comparable graphs shown in FIGS. 6A and 6B.

FIG. 7A shows a relationship between the feedback torque demanded (x-axis) 901 and the feedback torque applied (y-axis) 902 for a dual motor drive assembly 1 according to a first aspect of the disclosure.

Solid line 910 represents the torque applied by the first motor 10 while dashed line 920 represents the torque applied by the second motor 11. The net torque applied by the two motors is represented by dashed line 930. In a first torque range 940 where torque is positive, the first motor 10 applies a torque shown by solid line 910 to provide feedback to the steering column 24 and steering wheel 26, while the second motor 11 applies a smaller magnitude torque known as an "offset torque" in the opposite direction to provide an "active" lock to eliminate or reduce transmission rattle. The roles of the motors 10, 11 change depending in which direction the driver is steering. In a second torque range 950 where torque is negative, the second motor 11 applies a feedback torque 920 to the steering column 24 and the first motor 10 applies a smaller magnitude "offset" torque 910 in the opposite direction.

The resultant relationship between the net torque applied by the two motors 10, 11 (x-axis 701) and mechanical friction torque generated by the interaction of sliding surfaces in the HWA assembly 80 (y-axis 702), such as quasi-static Coulomb friction, is shown in FIG. 6B by solid line 700.

FIGS. 7A and 7B are comparable to comparable graphs shown in FIGS. 6A and 6B differing only in having a modified baseline allocation scheme such as that described by Equations 1, 2 and 3. This modified baseline allocation scheme allows the mechanical friction to be varied in a central region consisting of the first torque range 940 and the second torque range 950. The increase in the difference between the torque allocated to the first motor 910 and the torque allocated to the second motor 920 in the central region increases the mechanical friction as shown through comparison of FIG. 6B and FIG. 7B.

A further increase in mechanical friction within this central region may be achieved by further increasing the difference between the torque allocated to the first motor 910 and the torque allocated to the second motor 920 in the central region. Results of such modifications are shown in FIG. 7A as dashed lines 910a, 910b and 910c. The resultant relationships between the net torque applied by the two motors 10, 11 and mechanical friction torque generated by the interaction of sliding surfaces in the HWA assembly 80 is shown in FIG. 7B by dashed lines 700a, 700b and 700c (corresponding to dashed lines 910a, 910b and 910c respectively). Block arrow 960 indicates the direction in which mechanical friction increases between the profiles 910, 910a, 910b and 910c in FIG. 7A while block arrow 760 indicates the direction in which mechanical friction increases between the profiles 700, 700a, 700b and 700c in FIG. 7B.

This modified baseline allocation scheme uses the limits of friction control imposed by Equation 3 and so maintains a set net torque applied by the two motors 10, 11 at which both motors 10, 11 are energised in the same direction (point Tc).

FIGS. 8A and 8B show another modification to the baseline scheme that utilises a different range of the friction control to the range defined by Equation 3.

The torque may be allocated to the two motors 10, 11 to control the level of mechanical friction whilst maintaining a backlash-compensating offset.

FIG. 8A shows a relationship between the feedback torque demanded (x-axis) 901 and the feedback torque applied (y-axis) 902 for a dual motor drive assembly 1 according to a first aspect of the disclosure.

Solid line 910' represents the torque applied by the first motor 10 while dashed line 920' represents the torque applied by the second motor 11. The net torque applied by the two motors is represented by dashed line 930'. In a first torque range 940' where torque is positive, the first motor 10 applies a torque shown by solid line 910' to provide feedback to the steering column 24 and steering wheel 26, while the second motor 11 applies a torque shown by dashed line 920' known as an "offset torque" in the opposite direction to provide an "active" lock to eliminate or reduce transmission rattle. The roles of the motors 10, 11 change depending in which direction the driver is steering. In a second torque range 950' where torque is negative, the second motor 11 applies a feedback torque 920' to the steering column 24 and the first motor 10 applies an "offset" torque 910' in the opposite direction.

The resultant relationship between the net torque applied by the two motors 10, 11 (x-axis 701) and mechanical friction torque generated by the interaction of sliding surfaces in the HWA assembly 80 (y-axis 702), such as quasi-static Coulomb friction, is shown in FIG. 8B by solid line 700'.

The modified baseline allocation scheme allows the mechanical friction to be varied in a central region consisting of the first torque range 940' and the second torque range 950'. The increase in the difference between the torque allocated to the first motor 910' and the torque allocated to the second motor 920' in the central region increases the mechanical friction, as shown through comparison of FIG. 6B and FIG. 8B.

FIGS. 8A and 8B are comparable to comparable graphs shown in FIGS. 7A and 7B differing only in having a modified baseline allocation scheme with a different range of the friction control to the range defined by Equation 3. The first torque range 940' and the second torque range 950' of FIG. 8A therefore differ from the first torque range 940 and the second torque range 950 of FIG. 7A.

A further increase in mechanical friction at low values of net torque may be achieved by further increasing the difference between the torque allocated to the first motor 910' and the torque allocated to the second motor 920' in the central region. Profiles indicative of such modifications are shown in FIG. 8A as dashed lines 910'a, 910'b and 910'c. Block arrow 960' indicates the direction in which mechanical friction increases between the profiles 910', 910'a, 910'b and 910'c in FIG. 8A while block arrow 760' indicates the direction in which mechanical friction increases between the profiles 700', 700'a, 700'b and 700'c in FIG. 8B.

The resultant relationships between the net torque applied by the two motors 10, 11 and mechanical friction torque generated by the interaction of sliding surfaces in the HWA assembly 80 is shown in FIG. 8B by dashed lines 700a, 700b and 700c (corresponding to dashed lines 910a, 910b and 910c respectively).

The baseline scheme varies between each profile 910', 910'a, 910'b, 910'c such that the range of the friction control increases as mechanical friction increases. A set torque applied by the two motors 10, 11 at which both motors 10, 11 are energised in the same direction (point Tc') varies as the mechanical friction is increased.

Figure 9A:
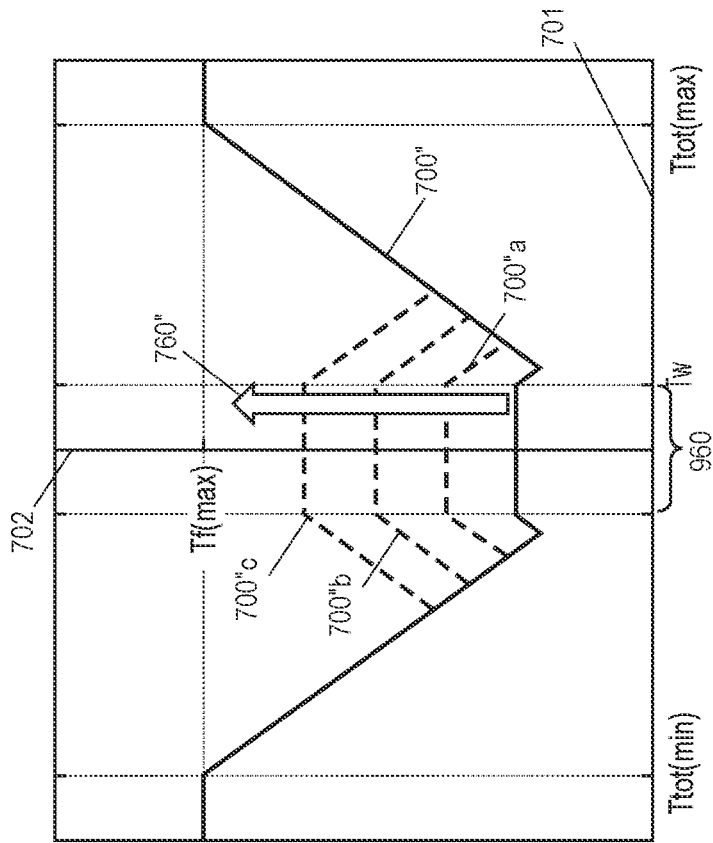
FIG. 9A shows a relationship between the total feedback torque demanded and the feedback torque applied for a dual motor drive assembly according to a first aspect of the disclosure.
Figure 9B:
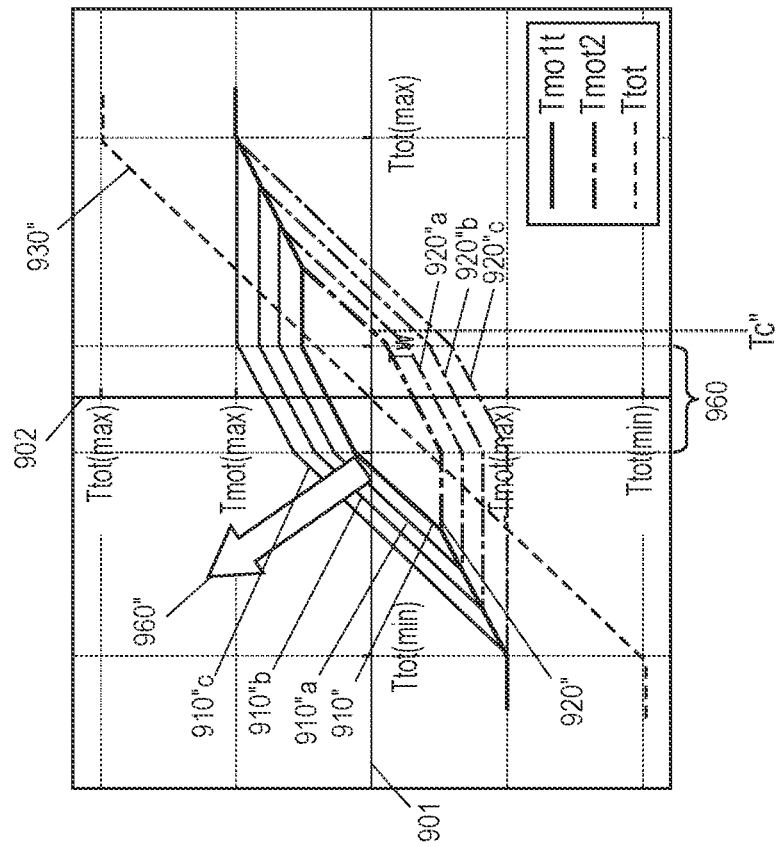
FIG. 9B shows the resultant relationship between the net torque applied in FIG. 9A and a mechanical friction torque generated by an interaction of sliding surfaces in an HWA assembly.

FIGS. 9A and 9B show another modification to the baseline scheme that utilises a different range of the friction control to the range defined by Equation 3. Here the range of friction control is a fixed torque band 960.

The torque may be allocated to the two motors 10, 11 to control the level of mechanical friction while maintaining a backlash-compensating offset.

FIG. 9A shows a relationship between the feedback torque demanded (x-axis) 901 and the feedback torque applied (y-axis) 902 for a dual motor drive assembly 1 according to a first aspect of the disclosure.

Solid line 910" represents the torque applied by the first motor 10 while dashed line 920" represents the torque applied by the second motor 11. The net torque applied by the two motors is represented by dashed line 930". In a first torque range 940" where torque is positive, the first motor 10 applies a torque shown by solid line 910" to provide feedback to the steering column 24 and steering wheel 26, while the second motor 11 applies a torque shown by dashed line 920" known as an "offset torque" in the opposite direction to provide an "active" lock to eliminate or reduce transmission rattle. The roles of the motors 10, 11 change depending in which direction the driver is steering. In a second torque range 950" where torque is negative, the second motor 11 applies a feedback torque 920" to the steering column 24 and the first motor 10 applies a "offset" torque 910" in the opposite direction.

The resultant relationship between the net torque applied by the two motors 10, 11 (x-axis 701) and mechanical friction torque generated by the interaction of sliding surfaces in the HWA assembly 80 (y-axis 702), such as quasi-static Coulomb friction, is shown in FIG. 9B by solid line 700".

The modified baseline allocation scheme allows the mechanical friction to be varied in a central region consisting of the first torque range 940" and the second torque range 950". The increase in the difference between the torque allocated to the first motor 910" and the torque allocated to the second motor 920" in the central region increases the mechanical friction, as shown through comparison of FIG. 6B and FIG. 9B.

FIGS. 9A and 9B are comparable to comparable graphs shown in FIGS. 8A and 8B differing only in having a modified baseline allocation scheme that utilises a different range of the friction control to the range defined by Equation 3. Here the range of friction control is a fixed torque band. The first torque range 940" and the second torque range 950" of FIG. 9A therefore differ from the first torque range 940' and the second torque range 950' of FIG. 8A.

A further increase in mechanical friction at low values of net torque may be achieved by further increasing the difference between the torque allocated to the first motor 910" and the torque allocated to the second motor 920" in the central region. Profiles indicative of such modifications are shown in FIG. 9A as dashed lines 910"a, 910"b and 910"c. Block arrow 960" indicates the direction in which mechanical friction increases between the profiles 910", 910"a, 910"b and 910"c in FIG. 9A while block arrow 760" indicates the direction in which mechanical friction increases between the profiles 700", 700"a, 700"b and 700"c in FIG. 9B.

The resultant relationships between the net torque applied by the two motors 10, 11 and mechanical friction torque generated by the interaction of sliding surfaces in the HWA assembly 80 is shown in FIG. 9B by dashed lines 700a, 700b and 700c (corresponding to dashed lines 910a, 910b and 910c respectively).

This modified baseline allocation scheme uses the limits of friction control imposed by Equation 3 and so maintains a set torque applied by the two motors 10, 11 at which both motors 10, 11 are energised in the same direction (point Tc).

This provides a further advantage whereby the motor torques at high torques can be equalised to reduce the motor heating.

Each profile 910", 910"a, 910"b, 910"c is subject to the same fixed torque band 960. As mechanical friction increases, a set torque applied by the two motors 10, 11 at which both motors 10, 11 are energised in the same direction (point Tc") varies as the mechanical friction is increased.

Figure 10:
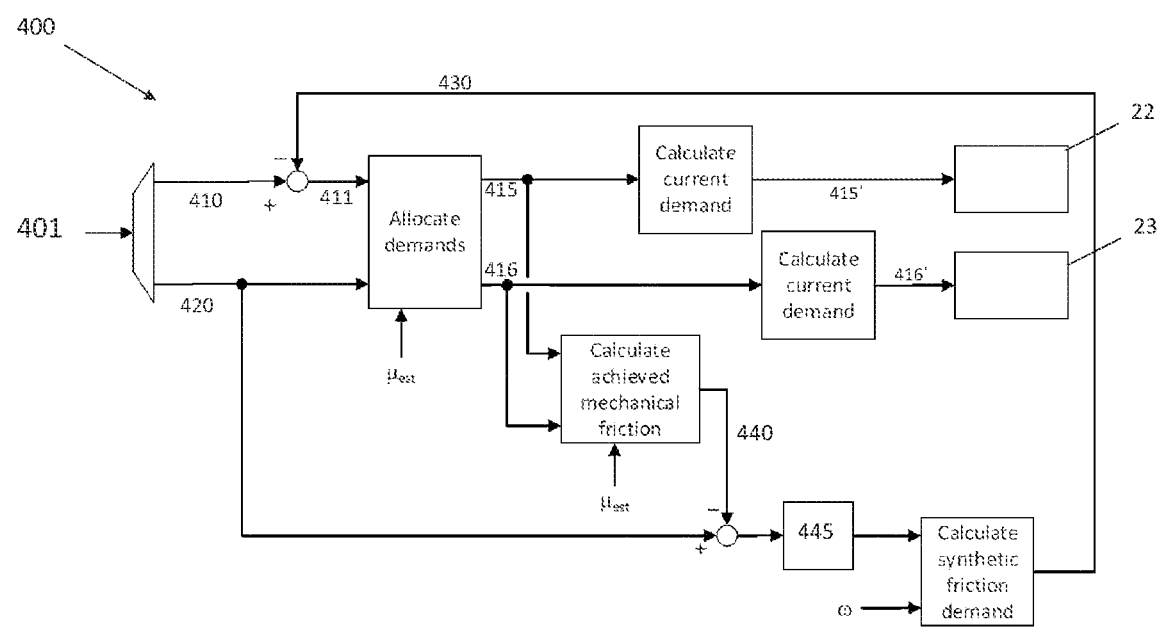
FIG. 10 shows an example arrangement of a Control System for combined friction control.
Figure 11:
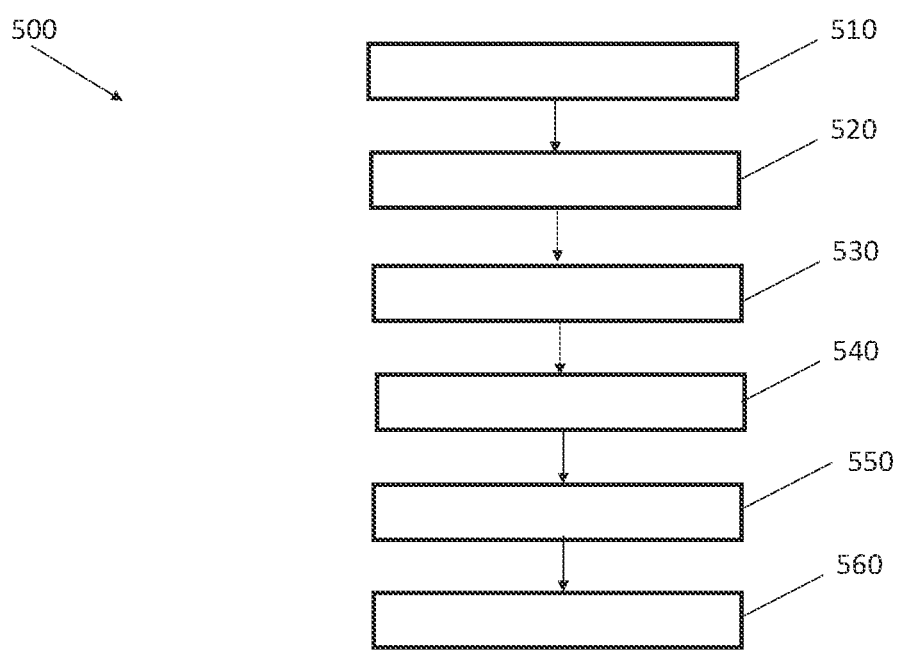
FIG. 11 shows an example method for combined friction control suitable for the control system of FIG. 10.

FIG. 10 shows an example arrangement of a Control System 400 for combined friction control. This control system may be standalone or implemented by another control system of a vehicle such as the handwheel actuator (HWA) assembly 80, the HWA control system 21, the steering controller 81 or the front axle actuator (FAA) 82.

The control system 400 implements a method 500 to integrate the mechanical friction generation, described in relation to FIGS. 7A to 9B, with a friction synthesis controller.

The method 500 includes six steps as follows.

A first step of the method 510 includes a torque demand 401 to the controller being separated into a torque feedback part 410 and a friction part 420.

A second step of the method 520 involves calculating a synthetic friction demand 430 and subtracting this from the torque feedback part 410 to give a modified torque demand 411.

In a third step 530 of the method 500, the modified torque demand 411 and the friction part 420 are used to calculate a motor torque demand 415 for the first motor 10 and a motor torque demand 416 for second motor 11, according to an allocation scheme such as shown in the FIGS. 7A to 9B. The allocation calculation limits the friction part 420 according to the limits of the selected allocation scheme.

In a fourth step 540 of the method 500, the motor torque demand 415 for the first motor 10 is converted to a motor current demand 415' and passed to the first motor controller 22. Similarly, the motor torque demand 416 for the second motor 11 is converted to a motor current demand 416' and passed to the second motor controller 23.

In a fifth step 550 of the method 500, the motor torque demands 415, 416 are used to calculate a mechanical friction magnitude 440.

A sixth step 560 of the method 500, involves using a difference between the mechanical friction magnitude 440 and the friction part to calculate the demanded synthetic friction 450. If there is insufficient mechanical friction 440, then the synthetic friction is simulated to increase the total perceived friction. If the mechanical friction 440 is too high, then the synthetic friction is used to compensate for the excess mechanical friction.

One example way to calculate the synthetic friction is to multiply the synthetic friction demand 450 by the sign of the measured angular velocity.

Additional measures may be taken in calculating the synthetic friction demand 450 to ensure that the algorithm operates in a stable manner without introducing oscillation and resonant behaviour.

Any or all steps in method 500 may be run concurrently to any or all other steps in method 500. The steps in method 500 may be completed in any order. Results from previously completed steps may be fed back into method 500 to create an iterative process. A delay 445 may to be inserted to break an algebraic loop; for example, it may be implemented in the synthetic friction demand.

An alternative method may be used in which the calculations are solved for the closed loop a priori such that a delay may not be required.

The invention claimed is:

1. A dual motor drive assembly comprising:
a housing;
a shaft rotatably mounted with respect to the housing;
a first gear connected to and configured to rotate with the shaft;
first and second motors, each having an output driving a respective output gear, the output gears being engaged with the first gear;
a torque allocation arrangement for allocating torque demands to each of the first and second motors;
a target friction determination arrangement for determining a target friction;
a calculator for calculating a mechanical friction;
wherein
the target friction and mechanical friction are compared, and wherein the mechanical friction is modified to meet the target friction by varying the difference between the two motor torque demands when the two motor torques are in opposing directions.

2. The dual motor drive assembly according to claim 1, wherein when the two motor torques are in opposing directions, the torque demand of the motors may be adjusted by an allocation scheme such that the torque demand allocated to each motor is increased or decreased by an equal and opposite magnitude.

3. The dual motor drive assembly according to claim 1, wherein the target friction comprises a mechanical friction component and a synthetic friction component, the synthetic friction component being the net torque applied to the worm wheel gear by the motors in a direction opposing the turning of the shaft by a driver of the vehicle.

4. The dual motor drive assembly according to claim 2, wherein, if the mechanical friction is greater than the target friction, then the synthetic friction is adjusted to oppose at least a portion of the mechanical friction such that a total friction is reduced.

5. The dual motor drive assembly according to claim 2, wherein if the mechanical friction is less than the target friction, then the synthetic friction is adjusted such that the total friction is increased.

6. The dual motor drive assembly according to claim 1, wherein the calculator for the mechanical friction uses any one or more of:
the allocated torque demands to each of the first and second motors;
the motor current demands of the first and second motors.

7. The dual motor drive assembly according to claim 1, wherein a total torque demand to a controller is separated into a torque feedback part and a friction part.

8. The dual motor drive assembly according to claim 7, wherein a synthetic torque demand is calculated and subtracted from the torque feedback part to give a modified torque demand.

9. The dual motor drive assembly according to any preceding claim 1, wherein the first and second motors are substantially identical the output gears are substantially identical so that the torque multiplication from each of the first and second motors to the shaft is the same.

10. The dual motor drive assembly according to claim 1, wherein the dual motor drive assembly forms part of a handwheel actuator assembly for a vehicle, wherein the shaft includes a fixing part whereby it can be fixed to a steering wheel or yoke.

11. The dual motor drive assembly according to claim 1, wherein the first gear comprises a worm wheel gear and each of the output gears comprises a worm screw, optionally wherein the rotational axes of the two worm screws extend perpendicularly to the rotational axis of the first gear.

12. A method of modifying a mechanical friction in a dual motor drive assembly, the dual motor drive assembly comprising:
a housing; a shaft rotatably mounted with respect to the housing; a first gear connected to and configured to rotate with the shaft; first and second motors, each having an output driving a respective output gear, the output gears being engaged with the first gear; and
wherein the method comprises the steps:
allocating torque demands to each of the first and second motors;
determining a target friction;
calculating a mechanical friction;
comparing the target friction and mechanical friction; and
when the two motor torques are in opposing directions, modifying the mechanical friction to meet the target friction by varying the difference between the two motor torque demands.

13. The method according to claim 12, wherein allocating torque demands to each of the first and second motors includes:
separating a total torque demand to the controller into a torque feedback part and a friction part;
calculating a synthetic friction demand and subtracting this from the torque feedback part to give a modified torque demand; and
calculating a motor torque demand for each of a first and second motor using the modified torque demand and the friction part, according to an allocation scheme.

14. The method according to claim 12 further including:
converting the motor torque demand for the first motor to a first motor current demand and passing the first motor current demand to a first motor controller;
converting the motor torque demand for the second motor to a second motor current demand and passing the second motor current demand to a second motor controller.

15. The method according to claim 13 , wherein calculating the mechanical friction includes measuring a difference between the mechanical friction magnitude and the friction part and calculating the demanded synthetic friction using the difference.

16. The dual motor drive assembly according to claim 2, wherein the target friction comprises a mechanical friction component and a synthetic friction component, the synthetic friction component being the net torque applied to the worm wheel gear by the motors in a direction opposing the turning of the shaft by a driver of the vehicle.

17. The dual motor drive assembly according to claim 16, wherein, if the mechanical friction is greater than the target friction, then the synthetic friction is adjusted to oppose at least a portion of the mechanical friction such that a total friction is reduced.

18. The dual motor drive assembly according to claim 17, wherein if the mechanical friction is less than the target friction, then the synthetic friction is adjusted such that the total friction is increased.

19. The dual motor drive assembly according to claim 7, wherein the modified torque demand and friction demand are used to calculate the two motor torque demands according to an allocation scheme.

20. The method according to claim 13 further including:
converting the motor torque demand for the first motor to a first motor current demand and passing the first motor current demand to a first motor controller;
converting the motor torque demand for the second motor to a second motor current demand and passing the second motor current demand to a second motor controller.

* * * * *